United States Patent
Shimizu

(10) Patent No.: US 7,660,018 B2
(45) Date of Patent: Feb. 9, 2010

(54) IMAGE READING DEVICE AND NOISE DETECTING METHOD

(75) Inventor: Kosuke Shimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 747 days.

(21) Appl. No.: 11/403,924

(22) Filed: Apr. 14, 2006

(65) Prior Publication Data

US 2007/0109605 A1 May 17, 2007

(30) Foreign Application Priority Data

Nov. 16, 2005 (JP) .............................. 2005-332019

(51) Int. Cl.
*H04N 1/407* (2006.01)
*H04N 1/409* (2006.01)
*H04N 1/46* (2006.01)

(52) U.S. Cl. ...................... 358/3.26; 358/504

(58) Field of Classification Search .................. 358/1.9, 358/3.26, 400, 406, 463, 500, 504, 505; *H04N 1/46, H04N 1/407, 1/409*
See application file for complete search history.

(56) References Cited

U.S. PATENT DOCUMENTS

| | | | | |
|---|---|---|---|---|
| 5,266,805 A | * | 11/1993 | Edgar | 250/330 |
| 7,257,270 B2 | * | 8/2007 | Yamaguchi | 382/275 |
| 2002/0176634 A1 | * | 11/2002 | Ohashi | 382/275 |
| 2005/0179954 A1 | * | 8/2005 | Arai et al. | 358/3.26 |
| 2005/0200904 A1 | * | 9/2005 | Prakash | 358/3.26 |
| 2005/0213838 A1 | * | 9/2005 | Kuramoto | 382/254 |
| 2006/0268345 A1 | * | 11/2006 | Silverstein | 358/3.26 |

FOREIGN PATENT DOCUMENTS

JP    A 2005-64913    3/2005

\* cited by examiner

*Primary Examiner*—James A Thompson
(74) *Attorney, Agent, or Firm*—Oliff & Berridge, PLC

(57) ABSTRACT

An image reading device compares pixel values of an image data, which is output when a document is not at a reading position, with a threshold and generates a first dust detection data; compares a image data, which is output while the document is passing the reading position, with a threshold and generates a second dust detection data; when dust is indicated as being present at a matching position in a main scanning direction in both the first dust detection data and the second dust detection data, generates a third dust detection data; and judges that noise is present when the third dust detection data indicates that dust is continuously present for at least a prescribed length in a sub scanning line direction.

20 Claims, 5 Drawing Sheets

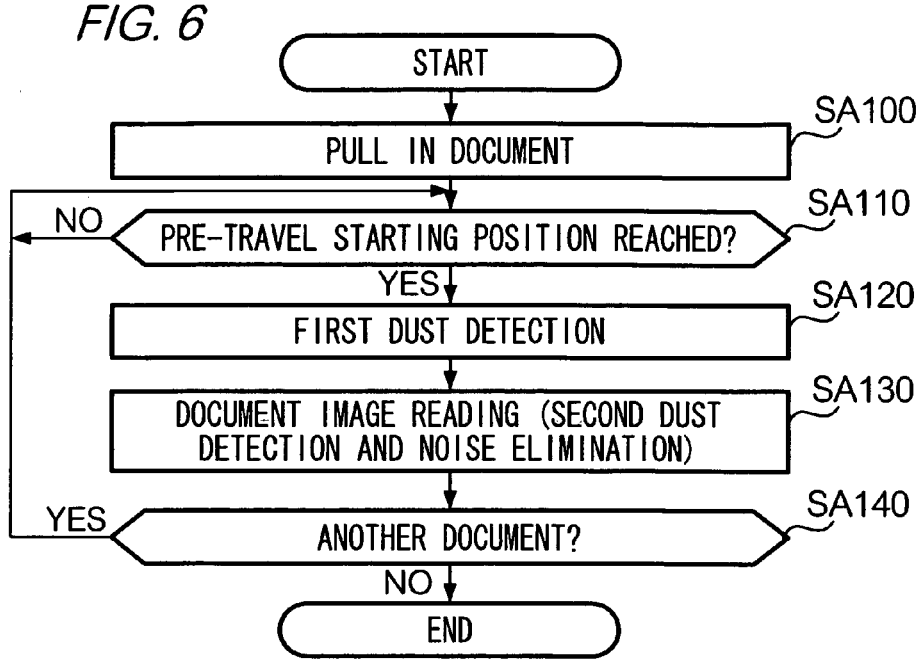
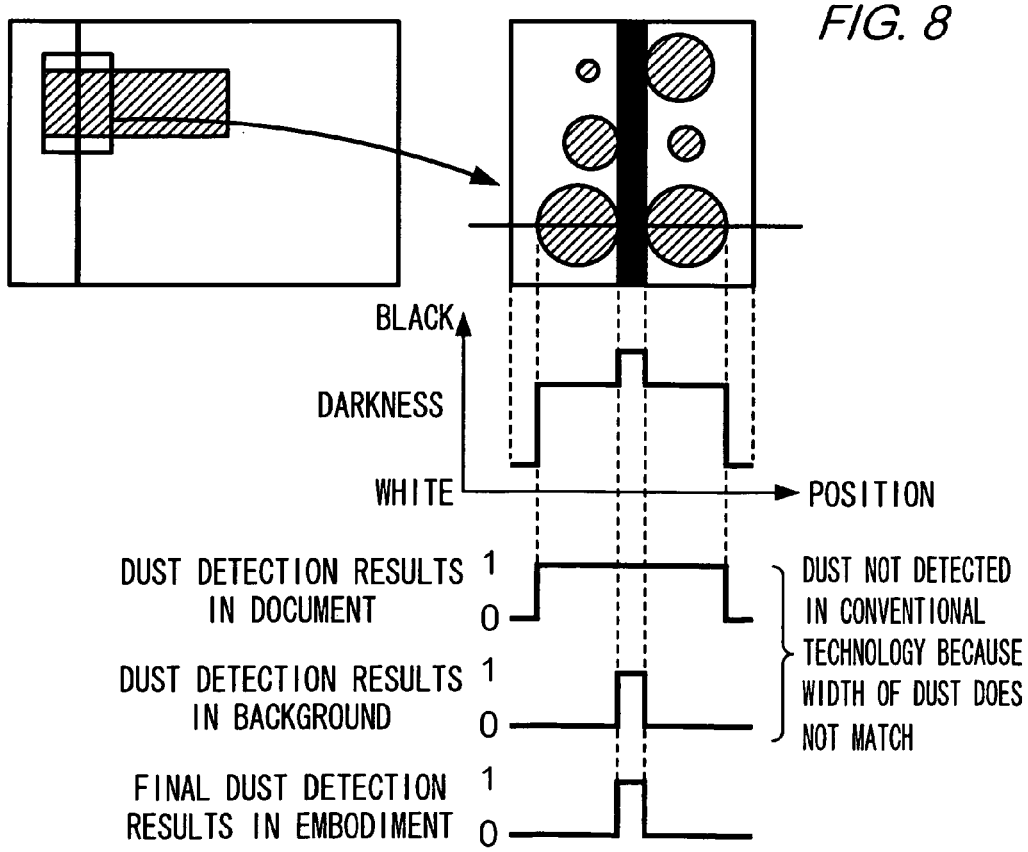

IMAGE READING DEVICE AND NOISE DETECTING METHOD

BACKGROUND

1. Technical Field

The present invention relates to, for example, image reading devices which are provided with functionality for carrying documents and for reading images from the documents during carrying.

2. Related Art

Certain types of image reading devices are configured such that a document is carried by a carrying device and an image of the document, which is traveling above a contact glass, is read through the contact glass. In such image reading devices, if dust is attached to the position where images are read on the contact glass, there are cases in which noise in the form of lines is generated in the read images due to that dust.

SUMMARY

The present invention provides, as one aspect, an image reading device including: a document carrying part that carries a document along a carrying path; a reading part that reads an image at a reading position which is decided ahead of time along the carrying path and outputs image data expressing the image; a first dust detecting part that compares pixel values of the image data, which is output by the reading part when the document is not at the reading position, with a prescribed threshold and generates a first dust detection data indicating positions of pixels which are affected by dust; a second dust detecting part that compares pixel values of the image data, which is output by the reading part while the document is passing the reading position, with a prescribed threshold and generates a second dust detection data; a third dust detection part that generates, in a case in which dust is indicated as being present at a matching position in a main scanning direction in both the first dust detection data and the second dust detection data, a third dust detection data which indicates the position of that dust; a noise judging part that judges that noise is present in a case in which the third dust detection data indicates that dust is continuously present for at least a prescribed length in a sub scanning line direction; and a process executing part that executes a process which has been decided upon ahead of time in a case in which noise is judged to be present by the noise detecting part.

BRIEF DESCRIPTION OF THE DRAWINGS

An embodiment of the present invention will be described in detail based on the following figures, wherein:

FIG. 6 is a flow-chart showing timing of a first and a second dust detection in the same embodiment;

FIG. 8 is a view for comparing dust detection and noise elimination in the same embodiment with conventional dust detection and noise elimination.

DETAILED DESCRIPTION

Below follows a description of an embodiment of the present invention, with reference to the drawings.

Figure 1:
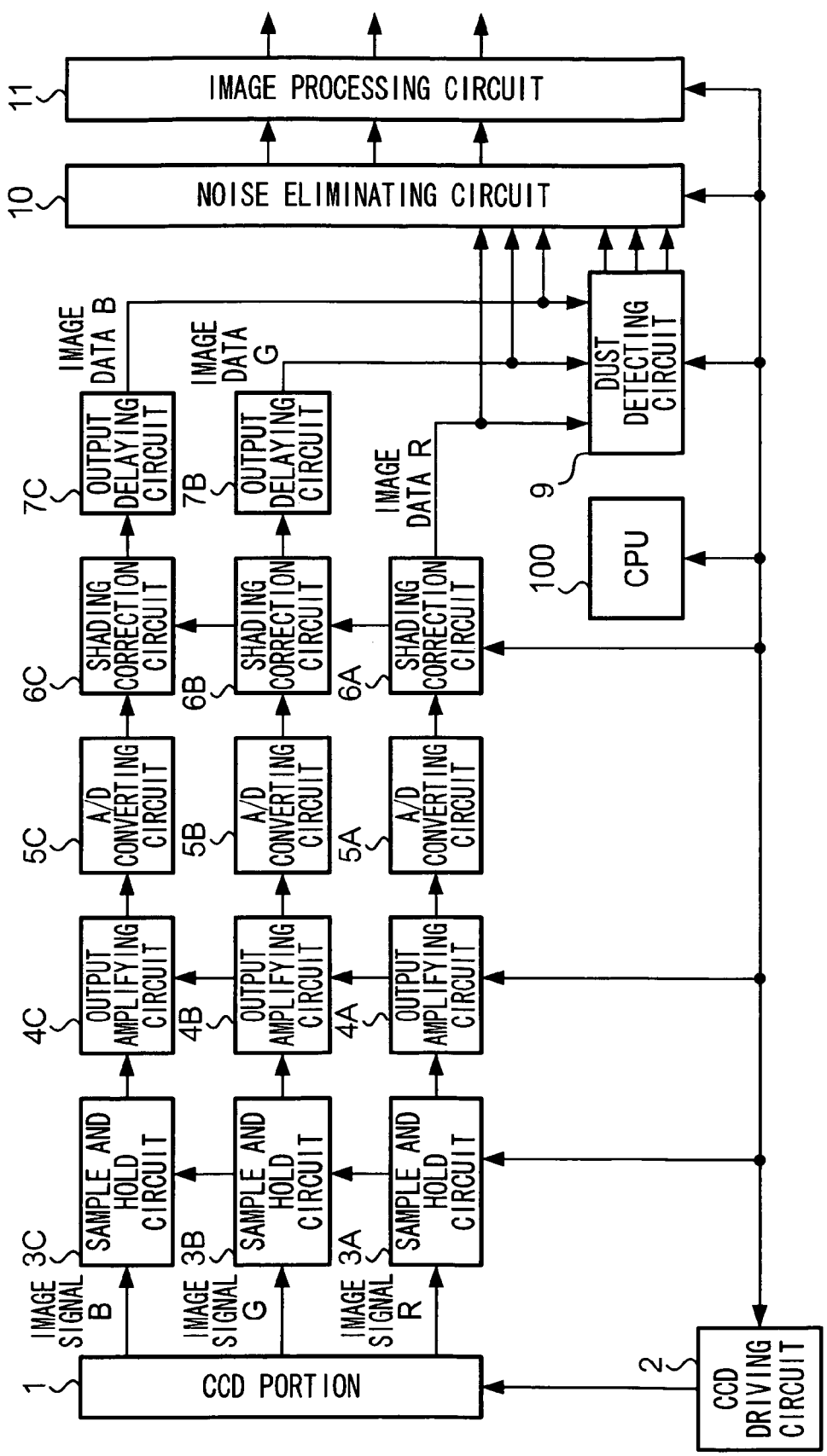
FIG. 1 is a block diagram showing an example configuration of an image reading device according to a first embodiment of this invention.

FIG. 1 is a block diagram showing a configuration of an image reading device which is a first embodiment of this invention.

In FIG. 1, a CCD portion 1 is a part that reads a document carried by a carrying device which is not shown. In the present embodiment, the CCD portion 1 reads a document image at three reading positions from the highest upstream reading position of the document carrying path to the lowest downstream reading position by being driven by a drive signal from a CCD driving circuit 2, and outputs analog image signals R, G, and B.

Figure 2:
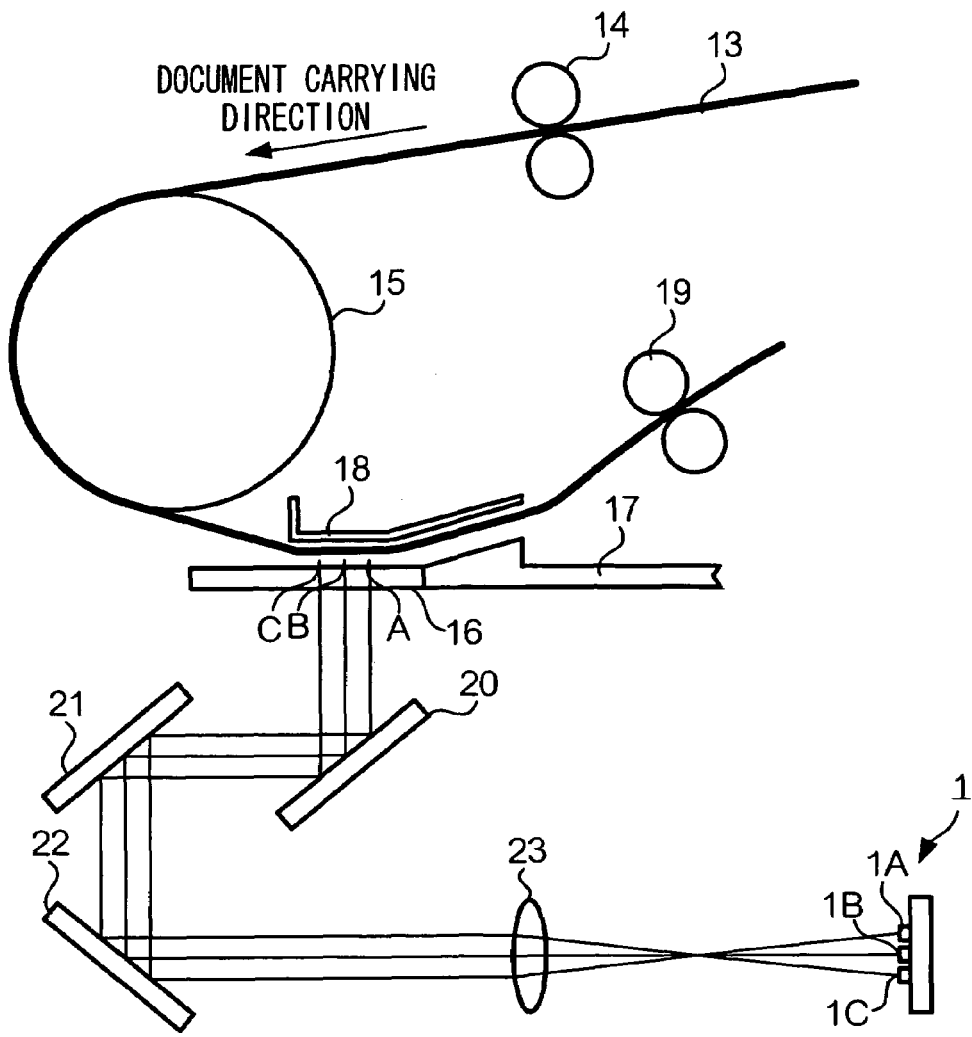
FIG. 2 is a view showing a configuration of a document carrying device and an optical system from a reading position of a document to a CCD portion in the same embodiment.

FIG. 2 shows a configuration of the document carrying device and a configuration of an optical system from the reading position along the document carrying path to the CCD portion 1. In FIG. 2, a document 13 is carried one page at a time up to a carrying roller 15 by a pull-in roller 14. The carrying roller 15 changes the document carrying direction and carries the document 13 at a constant carrying speed toward a contact glass 16. Thus carried, the document 13 is pressed against the contact glass 16 by a back platen 18 and finally ejected from the carrying device by an ejecting roller 19. The three reading positions from the highest upstream reading position to the lowest downstream reading position are provided on the contact glass 16. The document images at these reading positions have their optical paths changed by a first mirror 20, a second mirror 21, and a third mirror 22, are reduced by a lens 23, and reach three CCD line sensors 1A, 1B, and 1C which compose the CCD portion 1.

Here, the CCD line sensor 1C outputs the image signal B which expresses a B color component of N number of pixels arranged in a straight line in a direction (a main scanning direction) across a document carrying direction, at a highest upstream reading position C on the contact glass 16. The CCD line sensor 1B outputs the image signal G which expresses a G color component of N number of pixels arranged in a straight line in the main scanning direction at a reading position B downstream by a distance of four main scanning lines (hereafter called simply "equivalent to four lines") from the highest upstream reading position. The CCD line sensor 1A outputs the image signal R which expresses an R color component of N number of pixels arranged in a straight line in the main scanning direction at a lowest downstream reading position A the equivalent of four lines from the reading position which corresponds to the image signal G.

In FIG. 1, a signal processing system A which is made up of a sample and hold circuit 3A, an output amplifying circuit 4A, an A/D converting circuit 5A, and a shading correction circuit 6A, a signal processing system B which is made up of a sample and hold circuit 3B, an output amplifying circuit 4B, an A/D converting circuit 5B, and a shading correction circuit 6B, and a signal processing system C which is similarly made up of 3C through 6C are provided to the subsequent stage of the CCD portion 1. The signal processing systems A through C are signal processing systems which correspond to the image signal R, the image signal G, and the image signal B obtained respectively at the reading positions A, B, and C.

Here, the analog image signals R, G, and B obtained from the CCD portion 1 are sampled by the sample and hold circuits 3A through 3C, amplified to an appropriate level by the output amplifying circuits 4A through 4C, and converted to digital image data R, G, and B by the A/D converting circuits 5A through 5C. Correction corresponding to sensitivity variation in the CCD line sensors 1A through 1C and the light intensity distribution properties of the optical system is implemented on the digital image data R, G, and B by the shading correction circuits 6A through 6C. The above is a summary of the signal processing systems for the image signals R, G, and B.

The output delaying circuits 7B and 7C delay the image data G and B which is output from the shading correction circuits 6B and 6C by a delay time equivalent to four lines and equivalent to eight lines, respectively, and outputs the image data G and B as image data in phase with the image data R.

The dust detecting circuit 9 is a part that detects pixels affected by dust based on the image data output by the shading correction circuit 6A and the output delay circuits 7B and 7C and outputs dust detection data indicating locations where dust is present. The noise eliminating circuit 10 is a part that eliminates noise in the form of lines originating in dust from the image data B, G, and R based on the dust detection data from the dust detecting circuit 9, and outputs to an image processing circuit 11. The dust detecting circuit 9 and the noise eliminating circuit 10 are described in detail below.

The image processing circuit 11 is a part that implements image processes such as color space conversion, enlargement and reduction, ground color deletion, binarization, and the like which are needed for devices on which this image reading device is mounted (digital photocopiers, scanners, etc.) for image data output from the noise eliminating circuit 10.

A CPU 100 is a part that controls the various portions of the image reading device. Specifically, the CPU 100 sets a drive cycle of the CCD portion 1 performed by the CCD driving circuit 2, controls the gain of the output amplifying circuits 4A through 4C, and controls the shading correction circuits 6A through 6C, the dust detecting circuit 9, the noise eliminating circuit 10, the image processing circuit 11, and more.

The above is an overall configuration of the image reading device according to the present embodiment.

Figure 3:
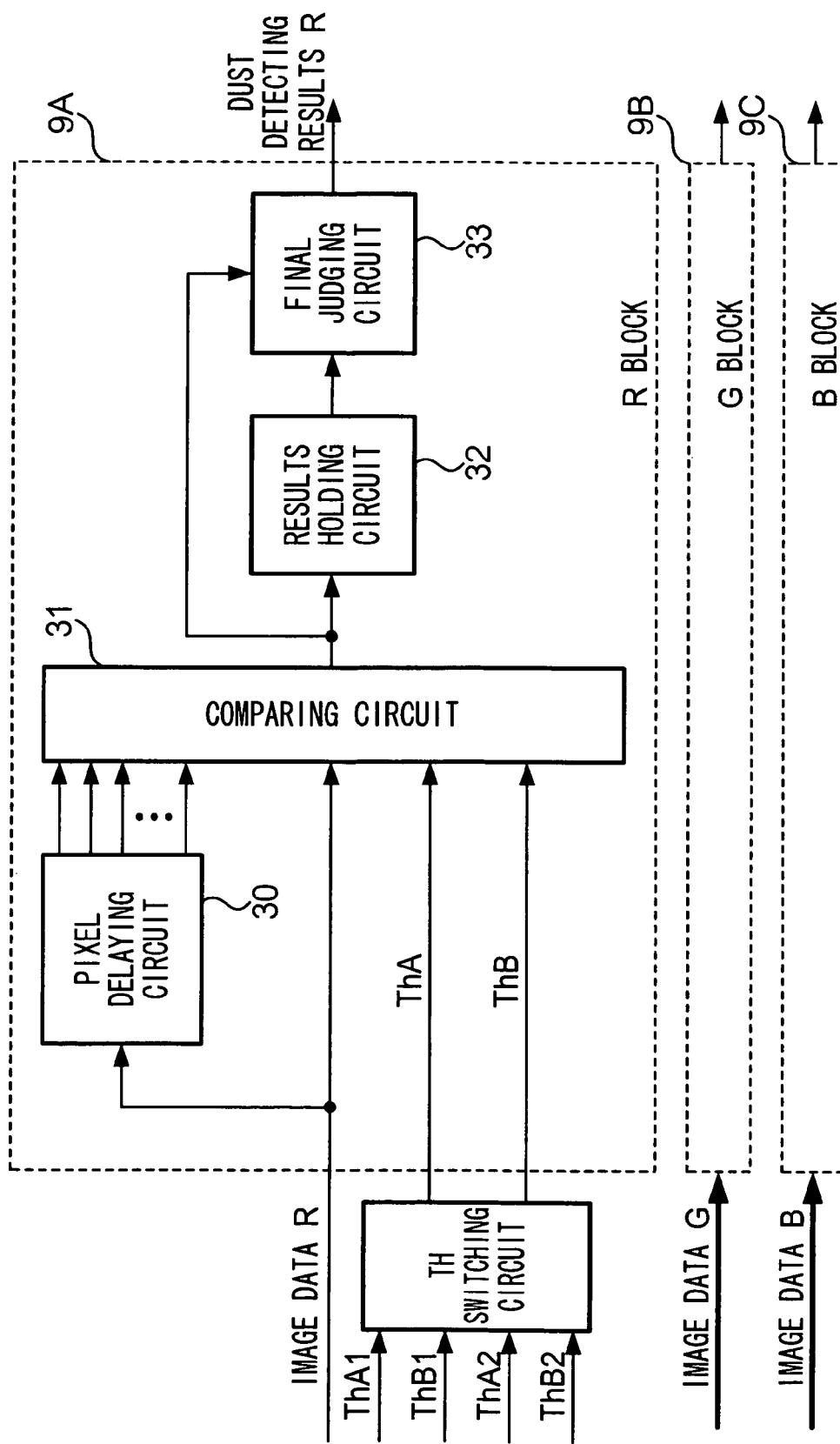
FIG. 3 is a block diagram showing a configuration of a dust detecting circuit in the same embodiment.

Next, the dust detecting circuit 9 is described with reference to FIG. 3.

The dust detecting circuit 9 in the present embodiment is made up of three dust detecting circuits 9A, 9B, and 9C corresponding respectively to the image data R, G, and B. The dust detecting circuits 9A, 9B, and 9C are configured by a pixel delaying circuit 30, a comparing circuit 31, a results holding circuit 32, a final judging circuit 33, and a threshold switching circuit 34. Of these, the pixel delaying circuit 30, the comparing circuit 31, and the results holding circuit 32 make up a part that performs dust detection along the main scanning line at the reading positions based on the input image data and generates the dust detection data.

The image delay circuit 30 delays the input pixel data by 18 pixels, and outputs to the comparing circuit 31 a total of 19 pixels' worth of pixel data. The comparing circuit 31 performs dust detection based on the pixel data output from the pixel delaying circuit 30 and two thresholds (ThA and ThB) input from the threshold (designated as TH in FIG. 3) switching circuit 34, outputs dust detection data with a component bit of "1" for pixels where dust is judged as being present and, conversely, of "0" for pixels where dust is judged as not being present.

Figure 4:
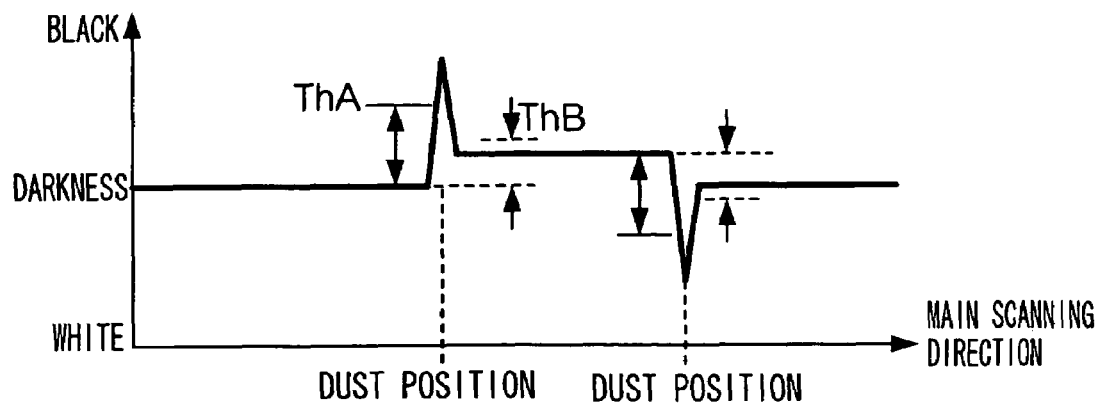
FIG. 4 is a view showing an example of one line's worth of image data in the same embodiment.
Figure 5:
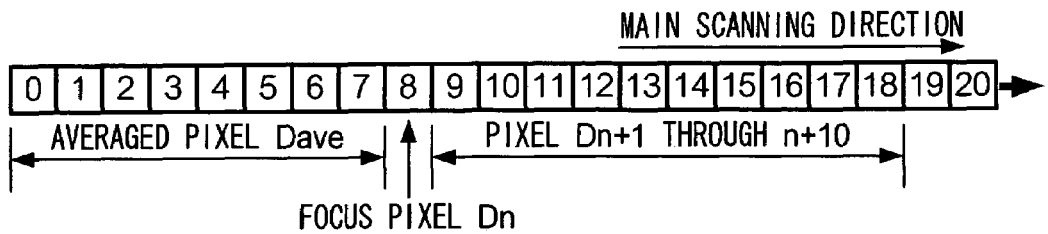
FIG. 5 is a view for describing a dust detecting algorithm in the same embodiment.

Specifically, the comparing circuit 31 judges that dust is present in pixels from a pixel where a change in the darkness equal to or greater the threshold ThA is generated through a pixel thereafter where the darkness returns to within the second threshold ThB, as shown in FIG. 4. Described in more detail, in a case in which the ninth pixel of 19 pixels (see FIG. 5) output from the pixel delaying circuit 30 is taken as a "focus pixel," and a pixel value Dn of the focus pixel and an average value Dave of pixel values of the eight pixels before the focus pixel in the main scanning direction satisfy the relationship of formula 1, the comparing circuit 31 judges that black-colored dust is present for the segment from the focus pixel until the pixel whose pixel value (Dn+1 through Dn+10) satisfies the relationship in formula 2 below among the ten pixels which follow the focus pixel. Here, the reason for comparing the pixel value of the focus pixel and the average values of the eight pixels which precede the focus pixel is to avoid the influence of miniscule fluctuations in the pixel values of the preceding pixels. Note that in this embodiment, a case was described in which an average value of pixel values for eight pixels preceding the focus pixel is calculated, but it is also possible to calculate an average value of pixel values for nine or more pixels or, needless to say, to calculate an average value for fewer than eight pixels. In the present embodiment, a case was described in which a judgment is made whether the pixel values of the ten pixels following the focus pixel satisfy the relationship in formula 2. This makes it possible to detect dust with a width of a maximum of 11 pixels. However, the number of pixels for judging whether the relationship in formula 2 is satisfied or not is not limited to 10, but may be set as appropriate in accordance with the maximum width of detectable dust.

$$Dave+ThA<Dn \quad \text{(Formula 1)}$$

$$Dn+1 \text{ through } n+10<Dave+ThB \quad \text{(Formula 2)}$$

Furthermore, if the pixel value Dn of the focus pixel and Dave above satisfy the relationship in formula 3, the comparing circuit 31 judges that white-colored dust is present in a segment from the focus pixel until a pixel at which a pixel value (Dn+1 through Dn+10) among the ten pixels following the focus pixel satisfies the relationship in formula 4 below.

$$Dave-ThA>Dn \quad \text{(Formula 3)}$$

$$Dn+1 \text{ through } n+10>Dave-ThB \quad \text{(Formula 4)}$$

The comparing circuit 31 outputs as the dust detection data the logical sum of the judgment results of formula 1 and formula 2 with the judgment results of formula 3 and formula 4. The results holding circuit 32 is a circuit that holds one line's worth of dust detection data which is output from the comparing circuit 31 by an instruction from the CPU 100.

Returning to FIG. 3, the threshold switching circuit 34 inputs to the comparing circuit 31 as the threshold ThA either a threshold ThA1 or ThA2, which are set ahead of time, and inputs to the comparing circuit 31 as the threshold ThB either a threshold ThB1 or ThB2, which are set ahead of time. Further, in the present embodiment, a case was described in which a threshold switching circuit 34 is provided to each of the dust detection circuits 9A, 9B, and 9C. By doing this, it is possible to set differing combinations of thresholds for the color components R, G, and B, but it is needless to say also possible to set the above two thresholds for each of the dust detection circuits 9A, 9B, and 9C using one threshold switching circuit 34. Further, in the present embodiment, a case was described in which switching between the two thresholds is performed using the threshold switching circuit 34, but in an aspect in which a constant threshold is always used, it is needless to say unnecessary to provide this kind of switching circuit.

Next, the execution timing of dust detection and noise elimination in the present embodiment is described with reference to FIG. 7A and FIG. 7B. FIG. 6 is a flowchart showing the flow of dust detection and noise elimination processes executed by the image reading device according to the present embodiment.

When a document which is to be read is set in, for example, an ADF (Auto Document Feeder) or other type of automatic paper feeding mechanism (not shown) and a start button (not shown) is pressed, the document set in the ADF is pulled in one page at a time (step SA100), and, for example, operation control of the carrying device is performed such that carrying of the document is begun by a DADF which is a carrying system control part made up of the CPU, for example.

The CPU 100 judges whether the document, which is pulled in by the ADF and carried by the carrying device, has reached a prescribed position (hereafter, the pre-travel start position) (step SA110). In more detail, in the present embodiment, the document pulled in by the ADF is carried along the carrying path at a constant carrying speed, so the CPU 100 judges that the document has reached the above document pre-travel starting position when a value is reached equal to the length of the carrying path from the ADF up to the above document pre-travel starting position divided by the above traveling speed. As long as the judgment result of step SA110 is "No," the CPU 100 repeatedly executes the judgment of step SA110, and when the judgment result of step SA110 becomes "Yes," it executes the processes beginning at step SA120.

In step SA120 which is executed after the judgment result of step SA110 is "Yes," operations for dust detection described above (see FIG. 4 and FIG. 5) are performed by the dust detecting circuit 9 under control of the CPU 100 (hereafter called "first dust detection"). When the first dust detection begins, the document is at the document pre-travel starting position, so a main scan by the CCD portion 1 is performed for three lines, for example, with the document not at the reading positions corresponding to R, G, and B, and image data which is obtained as a result is passed to the dust detecting circuit 9. When this happens, at the dust detecting circuits 9A, 9B, and 9C which correspond to the colors, the one line's worth of dust detection data (the first dust detection data) before reading the document which is obtained from the comparing circuit 31 is held by the results holding circuit 32. While the first dust detection is being performed, the document is carried at a constant carrying speed by the carrying device, and is carried to the reading positions which correspond to the colors R, G, and B.

Figure 7A:
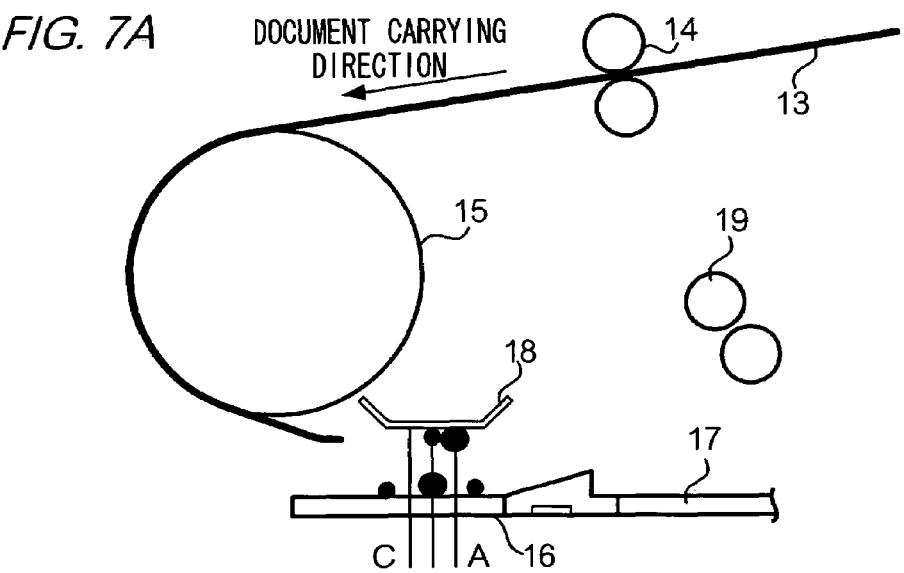
FIG. 7A and FIG. 7B are views for describing of a first and a second dust detection in the same embodiment.

FIG. 7A is a view showing an example of the first dust detection. At the point where the first dust detection is being executed, the document has still not reached the reading positions, so, as shown in FIG. 7A, the dust attached to the reading positions above the contact glass 16 and the dust attached to the reading positions on the back platen 18 are detected.

Then, when reading the document, while the document is passing the reading positions A, B, and C which correspond to the colors R, G, and B, the main scanning of the CCD portion 1 is repeated and the image is read, under control of the CPU 100, while dust detection (hereafter, "second dust detection) and noise elimination are performed using image data which is the results of that reading (step SA130), and as long as there is a next document (step SA140: Yes), the processes from step SA110 through step SA130 are repeatedly executed for each document.

In the second dust detection which is executed at step SA130, the dust detecting circuits 9A, 9B, and 9C perform the operations for dust detection described above using the pixel data of the read image of the document achieved by the main scan (see FIG. 4 and FIG. 5), and the comparing circuits 31 in the dust detecting circuits 9A, 9B, and 9C which correspond to each color output one line's worth of dust detection data (the second dust detection data) every time the main scan is performed.

Figure 7B:
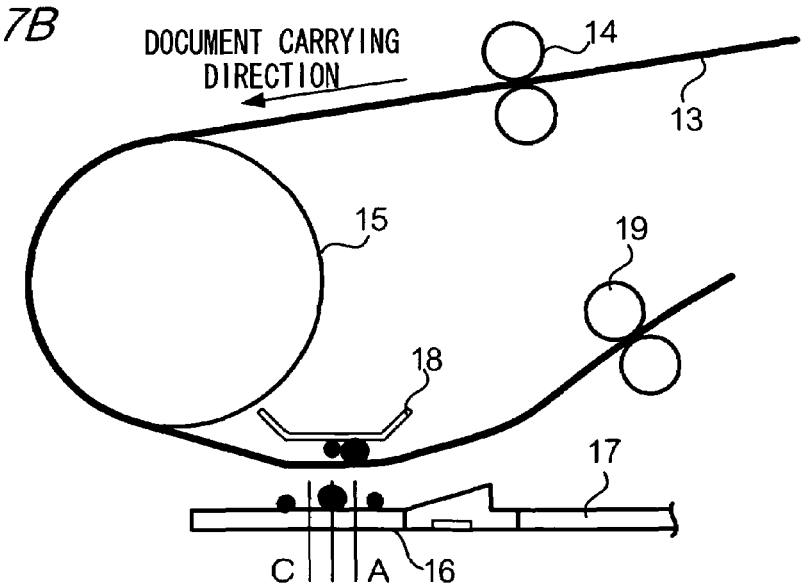

FIG. 7B is a view showing an example of the second dust detection. As shown in FIG. 7B, at the point where the second dust detection is being executed, dust attached to the back platen 18 is covered by the document, and only dust attached to the reading positions on the contact glass 16 is detected. Since dust which is attached to the back platen 18 is not detected by the second dust detection, it is judged that no dust is present when cross-referenced with the detection results of the first dust detection. However, since the dust attached to the back platen 18 does not affect the document image, this is not particularly a problem. During the second dust detection, no dust detection data is written into the results holding circuit 32, and the results holding circuit 32 outputs to the final judging circuit 33 the first dust detection data obtained during the dust detection before reading the document.

When the document is being read, the final judging circuit 33 receives the second dust detection data from the comparing circuit 31 and logically ANDs it with the first dust detection data from before reading the document which is output from the results holding circuit 32. Specifically, the final judging circuit 33 sets pixels which are both "1" in the first dust detection data and in the second dust detection data as pixels where dust is present, and outputs the third dust detection data in which the bits corresponding to these "dust pixels" is set to "1" and the bits corresponding to other pixels is set to "0."

The first embodiment of the present invention has been described, but the following modifications to this embodiment may also, needless to say, be made.

(1) In the above embodiment, a case was described in which dust detection and noise elimination are performed for RGB images. Needless to say, a modification is also possible in which dust detection and noise elimination are performed after converting RGB image data to image data of other color systems (e.g., Lab image data). Furthermore, in the above embodiment a case was described in which an image is read using a color CCD (a three-line sensor), but, needless to say, a modification is also possible in which images are read using a one-line black-and-white CCD.

(2) In the above embodiment, a case was described in which the first dust detection and the second dust detection are performed at separate times using a single dust detecting circuit, but, needless to say, it is also possible to provide a dust detecting circuit for the first dust detection and a dust detecting circuit for the second dust detection. This way, an affect can be expected to make it possible to realize in a simple manner, for example, performing of dust detection using differing algorithms for the first dust detection and for the second dust detection.

(3) In the above embodiment, a case was described in which noise is deleted from image data expressing a document image in a case in which noise is detected based on the third dust detection data. However, in addition to deleting noise from the image data, it is also possible to encourage elimination of the dust by announcing via a beep or displaying a message or outputting an audio message indicating that dust is attached to the reading position, and it is also possible to execute the above alerting in lieu of noise elimination.

(4) In the above embodiment, a case was described in which the first dust detection and the second dust detection are performed at the stage of reading each document, when reading a document with multiple pages. This is in order to deal with dust attached to the reading position when reading the document, but, in a case in which the time (pre-travel time) needed from the pre-travel starting position until the document is carried to the reading position is short, and therefore the first dust detection cannot be completed during the pre-travel period, it is possible to, for example, perform the first dust detection at the point at which reading of the document is instructed, for multiple pages of a document, and detect the presence or absence of dust at the reading position by comparing those detection results with the detection results of the second dust detection for each page of the document.

(5) In the above embodiment, a case was described in which dust elimination is performed in a case in which a continuous number of pixels in the sub scanning direction which are judged to have dust is equal to or greater a prescribed value, after whether or not to perform dust elimination is selected by the noise eliminating circuit 10 based on whether or not a continuous number of pixels in the sub scanning direction which are judged to have dust is equal to or greater a prescribed value in the third dust detection data. However, it is, needless to say, possible to judge that dust is present in cases in which the pixels which are judged as having dust in the third dust detection data are equal to or higher than a prescribed frequency of presence within a prescribed range in the sub scanning direction, and then to eliminate dust indicated in that third dust detection data. With such an aspect, similarly to the embodiment described above, an effect is achieved in that dust detection and noise elimination can be properly performed, even for documents (documents containing a large amount of characters or images or halftone dot documents) for which there exists a risk in that dust detection and noise elimination cannot be properly performed by the technology disclosed in JP2005-64913A.

(6) In the above embodiment, a case was described in which a control program for causing the CPU 100 to execute a dust detection process that is characteristic of the image reading device according to the present invention is installed ahead of time in the image reading device, but it is also possible to write the program into a storage medium readable by a computer device such as, for example, a CD-ROM (Compact Disk-Read Only Memory) and distribute it, and install the program on a general image reading device using the storage medium. This makes it possible to endow general image reading devices with the same functionality as the image reading device according to the present invention.

As described above, the present invention provides, as one aspect, an image reading device including: a document carrying part that carries a document along a carrying path; a reading part that reads an image at a reading position which is decided ahead of time along the carrying path and outputs image data expressing the image; a first dust detecting part that compares pixel values of the image data, which is output by the reading part when the document is not at the reading position, with a prescribed threshold and generates a first dust detection data indicating positions of pixels which are affected by dust; a second dust detecting part that compares pixel values of the image data, which is output by the reading part while the document is passing the reading position, with a prescribed threshold and generates a second dust detection data; a third dust detection part that generates, in a case in which dust is indicated as being present at a matching position in a main scanning direction in both the first dust detection data and the second dust detection data, a third dust detection data which indicates the position of that dust; a noise judging part that judges that noise is present in a case in which the third dust detection data indicates that dust is continuously present for at least a prescribed length in a sub scanning line direction; and a process executing part that executes a process which has been decided upon ahead of time in a case in which noise is judged to be present by the noise detecting part.

With this kind of image reading device, in a case in which the first dust detection data and the second dust detection data indicate that there is dust in the same position and that dust is detected continuously in the sub scanning line direction, noise originating in that dust is judged to be present and the prescribed process is executed.

The present invention also provides, as another aspect, an image reading device including: a document carrying part that carries a document along a carrying path; a reading part that reads an image at a reading position which is decided ahead of time along the carrying path and outputs image data expressing the image; a first dust detecting part that compares pixel values of the image data, which is output by the reading part when the document is not at the reading position, with a prescribed threshold and generates a first dust detection data indicating positions of pixels which are affected by dust; a second dust detecting part that compares pixel values of the image data, which is output by the reading part while the document is passing the reading position, with a prescribed threshold and generates a second dust detection data; a third dust detection part that generates, in a case in which dust is indicated as being present at a matching position in a main scanning direction in both the first dust detection data and the second dust detection data, a third dust detection data which indicates the position of that dust; a noise judging part that judges that noise is present in a case in which the third dust detection data indicates that dust is present for at least a prescribed frequency within a prescribed range in a sub scanning line direction; and a process executing part that executes a process which has been decided upon ahead of time in a case in which noise is judged to be present by the noise detecting part.

With this kind of image reading device, in a case in which the first dust detection data and the second dust detection data indicate that there is dust in the same position and that dust is detected for at least a prescribed frequency within a prescribed range in the sub scanning line direction, noise originating in that dust is judged to be present and the prescribed process is executed.

The first detecting part and the second detecting part may detect the presence of dust at the reading position, sharing a single detecting circuit. With such an aspect, a first dust detection at the reading position and a second dust detection at the reading position are executed in sequence using a single detecting circuit, reducing the size of the circuitry of the entire image reading device compared to a case in which the first detecting part and the second detecting part are each provided with individual detecting circuits, thereby making the image reading device more compact.

The process which is decided upon ahead of time and is executed by the process executing part may be a process that eliminates noise indicated by the third dust detection data from the image data output from the reading part while the document is passing the reading position. With such an aspect, it is possible to eliminate noise generated originating in dust present at the reading position from the image data of the document before output.

The process which is decided upon ahead of time and is executed by the process executing part may be a process that provides a notification indicating that dust is present at the reading position. With such an aspect, it is possible to notify a user of the image reading device that dust is present at the reading position and encourage the user to eliminate the dust by cleaning the reading position and so on.

The first detecting part may execute dust detection at the reading position within the period from when carrying of the document begins to when the document reaches the reading position. With this aspect, it is possible, when reading a document with multiple pages, for the first dust detection to be executed within the pre-travel period from when carrying of each page of the document begins until when the reading position is reached, and for dust attached to the reading position to be detected during the image reading stage for the immediately preceding page of the document.

The present invention also provides, as another aspect, a noise detecting method for causing an image reading device that caries a document along a carrying path and that reads an image of the document at a reading position which is decided upon ahead of time along the carrying path, to detect the presence of dust at the reading portion, the noise detecting method including causing the image reading device to execute: (1) comparing pixel values of image data expressing an image of the reading position when the document is not at the reading position with a prescribed threshold and generating a first dust detection data indicating positions of pixels which are affected by dust; (2) comparing pixel values of image data expressing an image of the reading position while the document is passing the reading position with a prescribed threshold and generating a second dust detection data; (3) generating, in a case in which dust is indicated as being present at a matching position in a main scanning direction in both the first dust detection data and the second dust detection data, a third dust detection data which indicates the position of that dust; and (4) judging that noise is present in a case in which the third dust detection data indicates that dust is continuously present for at least a prescribed length in a sub scanning line direction.

With this kind of noise detecting method, in a case in which the first dust detection data and the second dust detection data indicate that there is dust in the same position and that dust is detected continuously in the sub scanning line direction, noise originating in that dust is judged to be present and the prescribed process is executed.

The present invention also provides, as another aspect, a noise detecting method for causing an image reading device that caries a document along a carrying path and that reads an image of the document at a reading position which is decided upon ahead of time along the carrying path, to detect the presence of dust at the reading portion, the noise detecting method including causing the image reading device to execute: (1) comparing pixel values of image data expressing an image of the reading position when the document is not at the reading position with a prescribed threshold and generating a first dust detection data indicating positions of pixels which are affected by dust; (2) comparing pixel values of image data expressing an image of the reading position while the document is passing the reading position with a prescribed threshold and generating a second dust detection data; (3) generating, in a case in which dust is indicated as being present at a matching position in a main scanning direction in both the first dust detection data and the second dust detection data, a third dust detection data which indicates the position of that dust; and (4) judging that noise is present in a case in which the third dust detection data indicates that dust is present for at least a prescribed frequency within a prescribed range in a sub scanning line direction.

With this kind of noise detecting method, in a case in which the first dust detection data and the second dust detection data indicate that there is dust in the same position and that dust is detected for at least a prescribed frequency within a prescribed range in the sub scanning line direction, noise originating in that dust is judged to be present and the prescribed process is executed.

The present invention also provides, as another aspect, a program that causes an image reading device that carries a document along a carrying path and reads images at a reading position which is decided upon ahead of time along the carrying path, to execute one or the other or both of the above two noise detection methods, and it is also possible to write the above program to a storage medium readable by a computer and distribute it. By doing this, it is possible to cause a conventional image reading device for carrying a document along a carrying path and reading images at a reading position which is decided upon ahead of time along the carrying path to execute one the noise detection method according the present invention, thereby making it possible to add the same functionality as that of the image reading device of the present invention.

With the present invention, the effect can be achieved of making it possible to reliably detect noise originating in dust on the reading position and eliminating that noise, even in cases in which the technology disclosed in JP2005-64913A cannot properly detect dust at the reading position when reading documents containing a large amount of characters or images or halftone dot documents (i.e., cases in which the position and width of dust expressed by the first dust detection data and the position and width of the dust expressed by the second dust detection data does not match).

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-332019 filed on Nov. 16, 2005 including specification, claims, drawings and abstract is incorporated herein by reference in its entirety.

What is claimed is:

1. An image reading device comprising:
a document carrying part that carries a document along a carrying path;
a reading part that reads an image at a reading position which is decided ahead of time along the carrying path and outputs image data expressing the image;
a first dust detecting part that compares pixel values of the image data, which is output by the reading part when the document is not at the reading position, with a prescribed threshold and generates a first dust detection data indicating positions of pixels which are affected by dust;
a second dust detecting part that compares pixel values of the image data, which is output by the reading part while the document is passing the reading position, with a prescribed threshold and generates a second dust detection data;
a third dust detection part that generates, in a case in which dust is indicated as being present at a matching position in a main scanning direction in both the first dust detection data and the second dust detection data, a third dust detection data which indicates the position of that dust, the second dust detection data being independent from the first dust detection data by virtue of the second dust detection data representing pixel values of image data while the document is passing the reading position and the first dust detection data representing pixel values of image data while the document is not at the reading position;

a noise judging part that judges that noise is present in a case in which the third dust detection data indicates that dust is continuously present for at least a prescribed length in a sub scanning line direction; and a process executing part that executes a process which has been decided upon ahead of time in a case in which noise is judged to be present by the noise detecting part.

2. The image reading device according to claim 1, wherein the first detecting part and the second detecting part detect the presence of dust at the reading position, sharing a single detecting circuit.

3. The image reading device according to claim 1, wherein the process which is decided upon ahead of time and is executed by the process executing part is a process that eliminates noise indicated by the third dust detection data from the image data output from the reading part while the document is passing the reading position.

4. The image reading device according to claim 1, wherein the process which is decided upon ahead of time and is executed by the process executing part is a process that provides a notification indicating that dust is present at the reading position.

5. The image reading device according to claim 1, wherein the first detecting part executes dust detection at the reading position within the period from when carrying of the document begins to when the document reaches the reading position.

6. The image reading device according to claim 1, wherein the third dust detection part removes data about dust which does not affect the recording of the image data from further consideration.

7. The image reading device according to claim 1, wherein the first dust detecting part and the second dust detecting part compares pixel values of the image data by comparing the brightness and darkness values of adjacent pixels.

8. An image reading device comprising:
a document carrying part that carries a document along a carrying path;
a reading part that reads an image at a reading position which is decided ahead of time along the carrying path and outputs image data expressing the image;
a first dust detecting part that compares pixel values of the image data, which is output by the reading part when the document is not at the reading position, with a prescribed threshold and generates a first dust detection data indicating positions of pixels which are affected by dust;
a second dust detecting part that compares pixel values of the image data, which is output by the reading part while the document is passing the reading position, with a prescribed threshold and generates a second dust detection data;
third dust detection part that generates, in a case in which dust is indicated as being present at a matching position in a main scanning direction in both the first dust detection data and the second dust detection data, a third dust detection data which indicates the position of that dust, the second dust detection data being independent from the first dust detection data by virtue of the second dust detection data representing pixel values of image data while the document is passing the reading position and the first dust detection data representing pixel values of image data while the document is not at the reading position;

a noise judging part that judges that noise is present in a case in which the third dust detection data indicates that dust is present for at least a prescribed frequency within a prescribed range in a sub scanning line direction; and a process executing part that executes a process which has been decided upon ahead of time in a case in which noise is judged to be present by the noise detecting part.

9. The image reading device according to claim 8, wherein the first detecting part and the second detecting part detect the presence of dust at the reading position, sharing a single detecting circuit.

10. The image reading device according to claim 8, wherein the process which is decided upon ahead of time and is executed by the process executing part is a process that eliminates noise indicated by the third dust detection data from the image data output from the reading part while the document is passing the reading position.

11. The image reading device according to claim 8, wherein the process which is decided upon ahead of time and is executed by the process executing part is a process that provides a notification indicating that dust is present at the reading position.

12. The image reading device according to claim 8, wherein the first detecting part executes dust detection at the reading position within the period from when carrying of the document begins to when the document reaches the reading position.

13. The image reading device according to claim 8, wherein
the third dust detection part removes data about dust which does not affect the recording of the image data from further consideration.

14. The image reading device according to claim 8, wherein
the first dust detecting part and the second dust detecting part compares pixel values of the image data by comparing the brightness and darkness values of adjacent pixels.

15. A noise detecting method for causing an image reading device that carries a document along a carrying path and that reads an image of the document at a reading position which is decided upon ahead of time along the carrying path, to detect the presence of dust at the reading portion,
the noise detecting method comprising causing the image reading device to execute:
(1) comparing pixel values of image data expressing an image of the reading position when the document is not at the reading position with a prescribed threshold and generating a first dust detection data indicating positions of pixels which are affected by dust;
(2) comparing pixel values of image data expressing an image of the reading position while the document is passing the reading position with a prescribed threshold and generating a second dust detection data;
(3) generating, in a case in which dust is indicated as being present at a matching position in a main scanning direction in both the first dust detection data and the second dust detection data, a third dust detection data which indicates the position of that dust, the second dust detection data being independent from the first dust detection data by virtue of the second dust detection data representing pixel values of image data while the document is passing the reading position and the first dust detection data representing pixel values of image data while the document is not at the reading position; and (4) judging that noise is present in a case in which the third dust detection data indicates that dust is continuously present for at least a prescribed length in a sub scanning line direction.

16. The noise detection method according to claim 15, further comprising:

removing data about dust which does not affect the recording of the image data from further consideration when generating the third dust detection data.

17. The noise detection method according to claim 15, wherein the pixel values of image data are compared by comparing the brightness and darkness values of adjacent pixels.

18. A noise detecting method for causing an image reading device that carries a document along a carrying path and that reads an image of the document at a reading position which is decided upon ahead of time along the carrying path, to detect the presence of dust at the reading portion, the noise detecting method causing the image reading device to execute:

(1) comparing pixel values of image data expressing an image of the reading position when the document is not at the reading position with a prescribed threshold and generating a first dust detection data indicating positions of pixels which are affected by dust;

(2) comparing pixel values of image data expressing an image of the reading position while the document is passing the reading position with a prescribed threshold and generating a second dust detection data;

(3) generating, in a case in which dust is indicated as being present at a matching position in a main scanning direction in both the first dust detection data and the second dust detection data, a third dust detection data which indicates the position of that dust, the second dust detection data being independent from the first dust detection data by virtue of the second dust detection data representing pixel values of image data while the document is passing the reading position and the first dust detection data representing pixel values of image data while the document is not at the reading position; and (4) judging that noise is present in a case in which the third dust detection data indicates that dust is present for at least a prescribed frequency within a prescribed range in a sub scanning line direction.

19. The noise detection method according to claim 18, further comprising:

removing data about dust which does not affect the recording of the image data from further consideration when generating the third dust detection data.

20. The noise detection method according to claim 18, wherein the pixel values of image data are compared by comparing the brightness and darkness values of adjacent pixels.

* * * * *